(12) United States Patent
Odaka et al.

(10) Patent No.: US 8,883,936 B2
(45) Date of Patent: Nov. 11, 2014

(54) CURABLE COMPOSITION

(75) Inventors: Hidetoshi Odaka, Takasago (JP);
Katsuhiro Ando, Pasadena, TX (US)

(73) Assignees: Kaneka Corporation, Osaka (JP);
Kaneka North America LLC,
Pasadena, TX (US)

( * ) Notice: Subject to any disclaimer, the term of this patent is extended or adjusted under 35 U.S.C. 154(b) by 0 days.

(21) Appl. No.: 13/988,209

(22) PCT Filed: Nov. 18, 2011

(86) PCT No.: PCT/JP2011/077273
§ 371 (c)(1),
(2), (4) Date: Jun. 20, 2013

(87) PCT Pub. No.: WO2012/070666
PCT Pub. Date: May 31, 2012

(65) Prior Publication Data
US 2013/0274409 A1      Oct. 17, 2013

Related U.S. Application Data

(60) Provisional application No. 61/416,818, filed on Nov. 24, 2010.

(51) Int. Cl.
C08L 71/00      (2006.01)
C08G 65/336     (2006.01)
C09D 171/02     (2006.01)

(52) U.S. Cl.
CPC ............ C09D 171/02 (2013.01); C08G 65/336 (2013.01)
USPC ............. 525/477; 528/35; 528/403; 528/405; 528/407; 528/414

(58) Field of Classification Search
None
See application file for complete search history.

(56) References Cited

U.S. PATENT DOCUMENTS

| | | |
|---|---|---|
| 3,169,899 A | 2/1965 | Steuber |
| 3,532,589 A | 10/1970 | David |
| 4,507,469 A | 3/1985 | Mita et al. |
| 6,503,995 B2 * | 1/2003 | Tsuji et al. ............... 528/31 |
| 2007/0042196 A1 | 2/2007 | Smith |
| 2009/0018228 A1 | 1/2009 | Mager et al. |

FOREIGN PATENT DOCUMENTS

| | | |
|---|---|---|
| JP | 42-19520 | 10/1967 |
| JP | 43-21112 | 9/1968 |
| JP | 55-009669 A | 1/1980 |
| JP | 03-043449 A | 2/1991 |
| JP | 2002-338683 A | 11/2002 |
| JP | 2004-002875 A | 1/2004 |
| JP | 2006-160839 A | 6/2006 |
| JP | 2008-195891 A | 8/2008 |
| JP | 2010-106063 A | 5/2010 |
| JP | 2010-106158 * | 5/2010 |
| JP | 2011-111525 A | 6/2011 |
| WO | 2009/007038 A1 | 1/2009 |

OTHER PUBLICATIONS

Machine translation of JP 2010-106158 (no date).*
Machine translation of JP 2011-111525 (no date).*
Translation of the International Preliminary Report on Patentability (PCT/IB/373) (1 page), (PCT/ISA/237) (4 pages) of International Application No. PCT/JP2011/077273 mailed Feb. 21, 2012.
International Search Report for PCT/JP2011/077273, Mailing Date of Feb. 21, 2012.

* cited by examiner

*Primary Examiner* — Marc Zimmer
(74) *Attorney, Agent, or Firm* — Westerman, Hattori, Daniels & Adrian, LLP

(57) ABSTRACT

Provided is a curable composition having excellent water vapor permeability, which enables to protect a building from rainwater or moisture in the air and release the water accumulated on the side of the base of the building, to the outside. Also provided is a curable composition which has easy workability and is less likely to allow migration or exudation of a plasticizer to the surface of the cured product. Also provided is a liquid waterproof coating material having moisture permeability which contains the curable composition. The curable composition includes an organic polymer (I) that has less than one hydrolyzable silyl group per molecule on average and contains 5 to 80 wt % of oxyethylene units.

19 Claims, No Drawings

CURABLE COMPOSITION

TECHNICAL FIELD

The present invention relates to a curable composition comprising one or more organic polymers having a hydrolysable, silicon-containing group which has a hydroxy group or hydrolyzable group bonded to a silicon atom and can form a siloxane bond to be cross-linked (hereinafter referred to also as a "reactive silyl group") More specifically, the present invention relates to a liquid waterproof coating material containing a curable composition comprising one or more organic polymers having a reactive silyl group and has good moisture permeability.

BACKGROUND ART

In order to protect a building from rainwater or moisture in the air, a construction method has been conventionally employed in which a waterproof sheet is attached to the external wall base or openings such as windows and doors.

A common sheet is both waterproof and moisture-proof, and thus cannot release water accumulated on the sheet at the base side to the outside through the waterproof sheet. For this reason, there are problems such as that the wood or the steel frame is corroded to deteriorate the building, and that mold grows so that the indoor air is contaminated and the health of the resident is then disturbed.

In order to solve such problems, a waterproof sheet having both waterproofness and moisture permeability has been developed. Typical examples of such a moisture-permeable waterproof sheet include nonwoven fabric formed by flashspinning. Nonwoven fabric formed by flashspinning is disclosed for example in Patent Document 1, and the production method thereof is disclosed for example in Patent Document 2. Nonwoven fabric obtained thereby has a moderate aperture, and blocks water but lets air and water vapor pass therethrough. As such nonwoven fabric, Tyvek (product of DuPont, registered trademark) produced by thermo-compression bonding three-dimensional plexifilamentary fibers of high-density polyethylene. This moisture-permeable waterproof sheet enables to prevent entry of water from the outside as well as to release the water accumulated inside to the outside as water vapor, thereby solving the above problems.

However, the locations around the openings such as windows/doors are not flat, and thus the waterproof sheet alone cannot easily form a waterproof layer. Therefore, such a location is usually sealed with the aid of an adhesive-backed waterproof tape. In this case, since the adhesive layer is formed from a rubber adhesive or asphalt adhesive, the moisture permeability of the entire tape decreases to raise the same problems as in common waterproof sheets.

Also in the case of the external wall base, since nails and adhesive tapes are used for the overlapping portion of moisture-permeable waterproof sheets, water sometimes enters the inside from gaps between the sheets and the nails or adhesive tapes during a long-term use.

Patent Document 3, for example, teaches a liquid waterproof coating material having moisture permeability to solve such a waterproofing problem in the locations around the openings and the external wall base. In this case, since a waterproof material layer is formed continuously, the gaps due to the adhesive-backed waterproof tapes or nails are significantly reduced. This enables energy saving owing to reduction in the internal air leakage, in addition to solving the problems such as the deterioration of the building and health disturbance.

However, the composition used for the liquid waterproof coating material as disclosed in Patent Document 3 contains a latex polymer (aqueous emulsion) which requires a long time for forming a coating film at low temperatures or high humidity. Disadvantageously, the composition has low workability in winter. Also, latex polymer coating films, not having high elasticity, cannot follow the distortion formed over a long period of time in the base, causing cracks, fractures, and the like therein to bring a problem such as a decrease in the waterproofness.

Meanwhile, organic polymers containing at least one reactive silyl group per molecule are known to be cross-linked by siloxane bond formation involving reactions such as hydrolysis of the reactive silyl group due to moisture or the like even at room temperature, and thereby provide rubbery cured products.

Among these reactive silyl group-containing organic polymers, those polymers which have a main chain skeleton of a polyoxyalkylene polymer are disclosed in Patent Document 4 and the like. These polymers have already been industrially produced and widely used in various applications such as sealants and adhesives.

Since reactive silyl group-containing polyoxyalkylene polymers have comparatively low viscosity, a nonaqueous liquid waterproof coating material having sufficient workability can be designed by using such a polymer even with no or small amount of a solvent. Further, reactive silyl group-containing polyoxyalkylene polymers can have practical curability even at low temperatures, and are thus workable in winter. Moreover, since such a reactive silyl group-containing polyoxyalkylene polymer is cured into a rubbery product having good elasticity, the cured polymer is expected to sufficiently follow the distortion of the base.

However, a liquid waterproof coating material containing a known curable composition containing the above polymer has the similar waterproofness to a waterproof sheet but does not have sufficient moisture permeability. For this reason, the above problems have not been completely solved. The present invention aims to increase the moisture permeability of the liquid waterproof coating material and maintain the moisture permeability for a long period of time while maintaining its waterproofness.

Patent Document 1: JP-B S42-19520 (U.S. Pat. No. 3,169, 899)
Patent Document 2: JP-B S43-21112 (U.S. Pat. No. 3,532, 589)
Patent Document 3: US 2007/0042196 A
Patent Document 4: JP-A 355-9669 (U.S. Pat. No. 4,507, 469)

SUMMARY OF THE INVENTION

The present invention aims to provide a curable composition that has excellent water vapor permeability, is workable at low temperatures, and is less likely to allow migration or exudation of a plasticizer to the surface of a cured product; and a liquid waterproof coating material containing the curable composition.

The present inventors have made studies to solve the above problems, and have found that use of a reactive silyl group-containing organic polymer including oxyethylene units as a plasticizing component achieves improvement. Thereby, the present invention has been completed.

That is, the present invention relates to:

(1) a curable composition including an organic polymer (I) that has less than one hydrolyzable silyl group per molecule on average and contains 5 to 80 wt % of oxyethylene units;

(2) the curable composition according to (1), wherein the organic polymer (I) is a polyoxyalkylene polymer that contains 5 to 80 wt % of oxyethylene units;

(3) the curable composition according to (1) or (2), wherein the organic polymer (I) is produced from a compound containing one active hydrogen as a starting material;

(4) the curable composition according to any one of (1) to (3), wherein the organic polymer (I) is produced by converting the active hydrogen of the starting material into a hydrolyzable silyl group;

(5) the curable composition according to any one of (1) to (4), wherein the number average molecular weight of the organic polymer (I) is 500 to 15,000;

(6) the curable composition according to any one of (1) to (5), wherein the organic polymer (I) is a copolymer of ethylene oxide and propylene oxide;

(7) a curable composition including 100 parts by weight of an organic polymer (II) having at least one hydrolyzable silyl group per molecule on average, and 5 to 200 parts by weight of the organic polymer (I) according to any one of (1) to (6);

(8) the curable composition according to (7), wherein the organic polymer (II) is a polyoxyalkylene polymer;

(9) the curable composition according to (7) or (8), wherein the organic polymer (II) contains oxypropylene units in a main chain thereof;

(10) the curable composition according to any one of (7) to (9), wherein the number average molecular weight of the organic polymer (II) is 2,000 to 50,000;

(11) the curable composition according to any one of (7) to (10), wherein the organic polymer (II) is produced by ring-opening addition polymerization of an alkylene oxide in the presence of a double metal cyanide complex catalyst;

(12) the curable composition according to any one of (7) to (11), wherein the organic polymer (II) contains, in a main chain skeleton thereof, a group represented by formula (2):

   (2)

wherein $R^5$ is a hydrogen atom or a monovalent organic group;

(13) the curable composition according to any one of (7) to (12), which contains 100 parts by weight of the organic polymer (II), 5 to 200 parts by weight of the organic polymer (I), 1 to 250 parts by weight of a filler, 0.1 to 20 parts by weight of an amino group-containing silane coupling agent, and 0.01 to 10 parts by weight of a curing catalyst; and

(14) a waterproof coating material including the curable composition according to any one of (1) to (13).

Use of the present liquid waterproof material enables to increase the energy efficiency and durability of buildings and prevent contamination of the indoor air.

BEST MODES FOR CARRYING OUT THE INVENTION

Hereinafter, the present invention is explained in detail.

The reactive silyl group in the reactive silyl group-containing organic polymers (I) and/or (II) is a group that has a hydroxy group or hydrolyzable group bonded to a silicon atom and can be cross-linked by forming a siloxane bond through a reaction catalyzed by a curing catalyst. Typical examples thereof include groups represented by

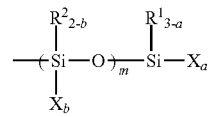

(wherein each of $R^1$ and $R^2$ represents a C1 to C20 alkyl group, a C6 to C20 aryl group, a C7 to C20 aralkyl group, a C1 to C10 α-haloalkyl group, or a triorganosiloxy group represented by $R'_3SiO$— (wherein R' is a C1 to C20 monovalent hydrocarbon group, and three R's may be the same as or different from each other), and in the case that there are two or more $R^1$s or $R^2$s, they may be the same as or different from each other; X represents a hydroxy group or hydrolyzable group, and in the case that there are two or more Xs, they may be the same as or different from each other; a represents 0, 1, 2, or 3; b represents 0, 1, or 2; bs in m×groups each represented by

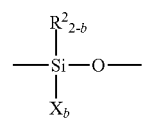

may not necessarily be the same as each other; and m represents an integer of 0 to 19, provided that a+(sum of bs)≥1 is satisfied).

The hydrolyzable group represented by X is not particularly limited, and may be any conventionally known hydrolyzable group. Specific examples thereof include a hydrogen atom, a halogen atom, an alkoxy group, an acyloxy group, a ketoxymate group, an amino group, an amide group, an acid amide group, an aminooxy group, a mercapto group, and an alkenyloxy group. Preferable among these are a hydrogen atom, an alkoxy group, an acyloxy group, a ketoxymate group, an amino group, an amide group, an aminooxy group, a mercapto group, and an alkenyloxy group. Particularly preferable is an alkoxy group because it contributes to mild hydrolysis and is easy to handle.

One to three hydrolyzable groups or hydroxy groups can be bonded to one silicon atom, and a+(sum of bs) is preferably in the range of 1 to 5. One to three hydrolyzable groups or hydroxy groups can be bonded to one silicon atom, and the number of groups is preferably two or three in terms of curability. In the case that two or more hydrolyzable groups or hydroxy groups are bonded to a silicon atom, those groups may be the same as or different from each other. A reactive silyl group containing three hydroxy groups or hydrolyzable groups on a silicon atom is preferable in terms of obtaining high activity and good curability, and excellence in the restorability, durability, and creep resistance of the cured product to be obtained. On the other hand, a reactive silyl group containing two hydroxy groups or hydrolyzable groups on a silicon atom is preferable in terms of excellent storage stability, and high elongation and high strength of the cured product to be obtained.

More specific examples of the reactive silyl group include a trimethoxysilyl group, a triethoxysilyl group, a triisopropoxysilyl group, a dimethoxmethylsilyl group, a diethoxymethylsilyl group, a diisopropoxymethylsilyl group, an α-chlorormethyldimethoxysilyl group, and an α-chloromethyldiethoxysilyl group.

In terms of the activity, an α-chloromethyldimethoxysilyl group, an α-chloromethyldiethoxysilyl group, a trimethoxysilyl group, a triethoxysilyl group, and a dimethoxymethylsilyl group are more preferable, and a trimethoxysilyl group is particularly preferable because a curable composition having high activity and good curability can be obtained.

Use of an organic polymer having an α-chloromethyldimethoxysilyl group, an α-chloromethyldiethoxysilyl group, or a trimethoxysilyl group, or combination use of an organic polymer containing an α-chloromethyldimethoxysilyl group, an α-chloromethyldiethoxysilyl group, or a trimethoxysilyl group with an organic polymer containing a dimethoxymethylsilyl group enables to obtain a curable composition having a high curing rate. Alternatively, introducing both of the groups into one organic polymer also enables to obtain a curable composition having a high curing rate. Use amount of a highly reactive organic polymer such as an organic polymer containing an α-chloromethyldimethoxysilyl group, an α-chloromethyldiethoxysilyl group, or a trimethoxysilyl group, and the ratio of the both groups in one organic polymer are appropriately determined such that a desired elongation at break of the cured product and a desired curing rate can be obtained.

In terms of storage stability, a dimethoxymethylsilyl group is particularly preferable. In terms of environmental suitability, a triethoxysilyl group and a diethoxymethylsilyl group are particularly preferable because an alcohol produced by hydrolysis reaction of the reactive silyl groups is ethanol and thus has higher safety.

The number of silicon atoms forming the reactive silyl group may be 1, or 2 or more, and may be about 20 in the case that the silicon atoms are connected through siloxane bonds or the like. Here, a reactive silyl group represented by

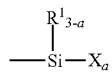

(wherein $R^1$ and X are as defined above, and a is an integer of 1, 2, or 3) is preferable in terms of easy availability. Specific examples of $R^1$ and $R^2$ in the above chemical formula include alkyl groups such as methyl and ethyl, cycloalkyl groups such as cyclohexyl, aryl groups such as phenyl, aralkyl groups such as benzyl, α-chloroalkyl groups such as α-chloromethyl, and triorganosiloxy groups represented by $R'_3SiO$— wherein R' is methyl, phenyl, or the like. Among these, methyl is preferable in terms of the balance between the curability and stability of the polymer, and α-chloromethyl is preferable in terms of particularly high curing rate of the curable composition. Particularly preferable among these is methyl in terms of easy availability.

Introduction of a reactive silyl group can be performed by a known method. That is, an organic polymer containing a functional group such as a hydroxy group, unsaturated group (e.g. vinyl group), epoxy group or isocyanato group in a molecule is allowed to react with a compound containing a reactive silyl group and a functional group that is reactive with the above functional group. Examples thereof include the following methods.

(i) An organic polymer containing a functional group such as a hydroxy group in a molecule is allowed to react with an organic compound containing an unsaturated group and an active group reactive with the functional group to provide an unsaturated group-containing organic polymer. Alternatively, the functional group-containing organic polymer is allowed to copolymerize with an unsaturated group-containing epoxy compound to provide an unsaturated group-containing organic polymer. Then, the reaction product is allowed to react with a reactive silyl group-containing hydrosilane for hydrosilylation.

Examples thereof include a method of alkoxidizing a hydroxy group-terminated polyoxyalkylene polymer obtained using an alkali metal catalyst such as KOH or a hydroxy group-terminated polyoxyalkylene polymer obtained using a double metal cyanide complex catalyst such as zinc hexacyanocobaltate; reacting the alkoxydized polymer with allyl chloride to produce an allyloxy ($CH_2$=$CHCH_2O$—) group-terminated polyoxyalkylene polymer; and allowing a silane compound such as dimethoxymethylsilane to act on the polymer for hydrosilylation. Alternatively, the method may be by alkoxydizing a hydroxy group-terminated polyoxyalkylene polymer, reacting the alkoxydized polymer with methallyl chloride to produce a methallyloxy group-terminated polyoxyalkylene polymer, and allowing a silane compound such as dimethoxymethylsilane to act on the polymer for hydrosilylation. Since use of a methallyloxy ($CH_2$=$C(CH_3)CH_2O$—) group-terminated polyoxyalkylene polymer enables to obtain a polymer having higher silylation rate than that in the case of an allyloxy group-terminated polyoxyalkylene polymer, a curable composition containing such a polymer can give a cured product having higher mechanical strength. A reactive silyl group-containing organic polymer derived from a methallyloxy group-terminated polyoxyalkylene polymer can be mixed with a reactive silyl group-containing organic polymer derived from an allyloxy group-terminated polyoxyalkylene polymer.

(ii) An unsaturated group-containing organic polymer obtained by the same manner as in the method (i) is allowed to react with a compound containing a mercapto group and a reactive silyl group.

(iii) An organic polymer containing a functional group such as a hydroxy group, an epoxy group or an isocyanato group in a molecule is allowed to react with a compound containing a reactive silyl group and a functional group that is reactive with the former functional group.

Preferable among these is the method (i) or the method (iii) in such a mode that a hydroxy-terminated polymer is allowed to react with a compound having an isocyanato group and a reactive silyl group because such methods achieve a high conversion rate in a relatively short period of time. Particularly preferable is the method (i). This is because the curable composition containing the reactive silyl group-containing organic polymer produced by the method (i) is likely to have a lower viscosity than the curable composition containing the organic polymer produced by the method (iii), and thus has better workability, and also because the organic polymer produced by the method (ii) has a strong odor due to mercaptosilane.

Preferable among these is the method (i) or (ii) in such a mode that a reactive silyl group-containing compound is reacted with an organic polymer at an end thereof.

Specific examples of the hydrosilane compound used in the method (i) include, but not limited to, halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, phenyldimethoxysilane, 1-[2-(trimethoxysilyl)ethyl]-1,1,3,3-tetramethyldisiloxane, α-chloromethyl dimethoxysilane, and α-chloromethyl diethoxysilane; acyloxysilanes such as methyldiacetoxysilane and phenyldiacetoxysilane; and ketoxymatesilanes such as bis(dimethylketoxymate)methylsilane and bis(cyclohexylketoxymate)methylsilane. In particular, halogenated silanes and alkoxysilanes are preferable. Most preferable are alkoxysilanes because a curable composition to be provided therefrom is mildly hydrolyzed and is easy to handle. Particularly preferable among the alkoxysilanes is methyldimethoxysilane because it is easily available and gives excellent properties (such as curability, storage stability, elongation property, and tensile strength) to the curable composition containing the polyoxyalkylene polymer to be provided. In terms of the curability of the curable composition to be provided and the restorability, trimethoxysilane is particularly preferable.

The synthesis method (ii) is not particularly limited. Examples thereof include a method of introducing a compound containing a mercapto group and a reactive silyl group into an unsaturated-bond moiety of a polyoxyalkylene polymer by radical addition reaction in the presence of a radical initiator and/or a radical generation source. The compound containing a mercapto group and a reactive silyl group is not particularly limited. Specific examples thereof include γ-mercaptopropyl trimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethylriethoxysilane.

The synthesis method (iii) in which a hydroxy-terminated polymer is allowed to react with a compound containing an isocyanato group and a reactive silyl group is not particularly limited. Specific examples thereof include a method as disclosed in JP-A H3-47825. The compound containing an isocyanato group and a reactive silyl group is not particularly limited. Examples thereof include γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, and isocyanatomethyldiethozymethylsilane.

In the case of a silane compound in which three hydrolyzable groups are bonded to one silicon atom, such as trimethoxysilane, disproportionation may proceed. As the disproportionation proceeds, dangerous compounds such as dimethoxysilane and tetrahydrosilane may be generated. In the case of γ-mercaptopropyltrimethoxysilane and γ-isocyanatopropyltrimethoxysilane, however, such disproportionation will not proceed. Thus, the synthesis method (ii) or (iii) is preferable in the case that a group in which three hydrolyzable groups are bonded to one silicon atom, such as a trimethoxysilyl group, is used as the silyl group.

Also, the disproportionation will not proceed in the case of a silane compound represented by formula (1):

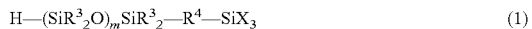

(wherein X is the same as defined above; 2×m+2 $R^3$s each independently are a hydrocarbon group or a triorrganosiloxy group represented by —OSi $(R'')_3$ (wherein R"s each independently are a substituted or unsubstituted C1 to C20 hydrocarbon group), and are preferably a C1 to C20 hydrocarbon group, more preferably a C1 to C8 hydrocarbon group, and particularly preferably a C1 to C4 hydrocarbon group in terms of availability and cost; $R^4$ is a divalent organic group, and is preferably a divalent C1 to C12 hydrocarbon group, more preferably a divalent C2 to C8 hydrocarbon group, and particularly preferably a divalent C2 hydrocarbon group in terms of availability and cost; and m is an integer of 0 to 19, and is preferably 1 in terms of availability and cost). For this reason, the silane compound represented by formula (1) is preferably used in the case of introducing a group in which three hydrolyzable groups are bonded to one silicon atom by the synthesis method (i). Specific examples of the silane compound represented by formula (1) include 1-[2-(trimethoxysilyl)ethyl]-1,1,3,3-tetramethyldisiloxane, 1-[2-(trimethoxysilyl)propyl]-1,1,3,3-tetramethyldisiloxane, and 1-[2-(trimethoxysilyl)hexyl]-1,1,3,3-tetramethyldisiloxane.

Examples of the organic polymers (I) and/or (II) include organic polymers such as polyoxypropylene polymers, polyoxybutylene polymers, polyisobutylene polymers, (meth)acrylate ester copolymers, and mixtures of these polymers.

The polyoxyalkylene polymer, an example of the organic polymers (I) and/or (II), may be produced by any synthetic method. Examples thereof include a polymerization method using an alkali catalyst such as KOH; a polymerization method in which a transition metal compound-porphyrin complex, such as a complex produced by the reaction between an organoaluminum compound and porphyrin, is used as a catalyst, as disclosed in JP-A S61-215623; polymerization methods in which a double metal cyanide complex is used as a catalyst, as disclosed in JP-B 346-27250, JP-B 859-15336, U.S. Pat. Nos. 3,278,457, 3,278,458, 3,278,459, 3,427,256, 3,427,334, 3,427,335, 5,158,922, 5,470,813, 5,482,908, 5,627,122, 5,891,818, and 6,063,897; a polymerization method in which a polyphosphazene salt is used as a catalyst, as disclosed in JP-A 110-273512; and a polymerization method in which a phosphazene compound is used as a catalyst, as disclosed in JP-A 811-060722.

Examples of the repeating unit in the main chain skeleton of the polyoxyalkylene polymer include repeating units derived from aliphatic alkylene oxides such as ethylene oxide, propylene oxide, 1,2-butylene oxide, 2,3-butylene oxide, epichlorohydrin, and tetraethylene oxide, and from aromatic alkylene oxides such as styrene oxide.

A reactive silyl group may be introduced into the polyoxyalkylene polymer by any method. Examples thereof include methods disclosed in JP-B S45-36319, JP-B S46-12154, JP-A 550-156599, JP-A S54-6096, JP-A S55-13767, JP-A S55-13468, JP-A 557-164123, JP-B H3-2450, U.S. Pat. Nos. 3,632,557, 4,345,053, 4,366,307, 4,960,844 and other documents; and methods of introducing a reactive silyl group such as a dimethoxymethylsilyl group into a polyoxypropylene polymer with a high molecular weight (average molecular weight of 6,000 or higher) and a narrow molecular weight distribution (Mw/Mn of 1.6 or below) as disclosed in JP-A 561-197631, JP-A S61-215622, JP-A 361-215623, JP-A S61-218632, JP-A H3-72527, JP-A H3-47825, and JP-A H8-231707. One species of the reactive silyl group-containing polyoxyalkylene polymer may be used alone or two or more species thereof may be used in combination.

The main chain skeleton of the polyoxyalkylene polymer may contain another component such as a urethane bond component as long as the effects of the present invention are not significantly lessened thereby.

The urethane bond component is not particularly limited. Examples thereof include a group formed through the reaction between an isocyanato group and an active hydrogen group (hereinafter, the group thus formed is also referred to as an "amide segment").

The amide segment is a group represented by formula (2):

(wherein $R^5$ is a hydrogen atom or a monovalent organic group, preferably a substituted or unsubstituted C1 to C20 monovalent hydrocarbon group, and more preferably a substituted or unsubstituted C1 to C8 monovalent hydrocarbon group).

Specific examples of the amide segment include a urethane group formed by reaction between an isocyanato group and a hydroxy group; a urea group formed by reaction between an isocyanato group and an amino group; and a thiourethane group formed by reaction between an isocyanato group and a mercapto group. Examples of the group represented by formula (2) herein also include groups formed by further reaction between an isocyanato group and active hydrogen in such a urethane group, urea group, and thiourethane group.

Examples of an industrially easy method of producing a polyoxyalkylene polymer that contains an amide segment and a reactive silyl group include methods as disclosed in JP-B S46-12154 (U.S. Pat. No. 3,632,557), JP-A S58-109529 (U.S. Pat. No. 4,374,237), JP-A S62-13430 (U.S. Pat. No. 4,645,816), JP-A 18-53528 (EP 0676403), JP-A 110-204144 (EP 0831108), JP-T 2003-508561 (U.S. Pat. No. 6,197,912), JP-A H6-211879 (U.S. Pat. No. 5,364,955), JP-A 110-53637 (U.S. Pat. No. 5,756,751), JP-A 3H1-100427, JP-A 2000-169544, JP-A 2000-169545, JP-A 2002-212415, JP-B 3313360, U.S. Pat. Nos. 4,067,844, 3,711,445, JP-A 2001-323040, JP-A H11-279249 (U.S. Pat. No. 5,990,257), JP-A 2000-119365 (U.S. Pat. No. 6,046,270), JP-A S58-29818 (U.S. Pat. No. 4,345,053), JP-A H3-47825 (U.S. Pat. No. 5,068,304), JP-A H11-60724, JP-A 2002-155145, JP-A 2002-249538, WO 03/018658, WO 3/059981, JP-A H6-211879 (U.S. Pat. No. 5,364,955), JP-A H10-53637 (U.S. Pat. No. 5,756,751), T-A H10-204144 (EP 0831108), JP-A 2000-169544, JP-A 2000-169545, and JP-A 2000-119365 (U.S. Pat. No. 6,046,270).

The curable composition of the present invention may contain a reactive silyl group-containing (meth)acrylate ester polymer if necessary.

The (meth)acrylate ester monomers constituting the main chain of the (meth)acrylate ester polymer are not particularly limited, and may be of any species. Examples thereof include: (meth)acrylate monomers such as (meth)acrylic acid, methyl (meth)acrylate, ethyl (meth)acrylate, n-propyl (meth)acrylate, isopropyl (meth)acrylate, n-butyl(meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl, (meth)acrylate decyl(meth)acrylate, dodecyl (meth)acrylate, phenyl(meth)acrylate, toluoyl (meth)acrylate, benzyl(meth)acrylate, 2-methoxyethyl (meth)acrylate, 3-methoxybutyl(meth)acrylate, 2-hydroxyethyl(meth)acrylate, 2-hydroxypropyl (meth)acrylate, stearyl(meth)acrylate, glycidyl (meth)acrylate, 2-aminoethyl (met) acrylate, γ-(methacryloyloxypropyl)trimethoxysilane, γ-(methacryloyloxypropyl)dimethoxymethylsilane, methacryloyloxymethyltrimethoxysilane, methacryloyoxymethyltriethoxysilane, methacryloylmethyldimethoxymethylsilane, methacryloylmethyldiethoxymethylsilane, (meth)acrylic acid-ethylene oxide adducts, trifluoromethylmethyl(meth)acrylate, 2-trifluoromethylethyl(meth)acrylate, 2-perfluoroethylethyl (meth)acrylate, 2-perfluoroethyl-2-perfluorobutyethyl (meth)acrylate, perfluoroethyl(meth)acrylate, trifluoromethyl(meth)acrylate, bis(trifluoromethyl)methyl (meth)acrylate, 2-trifluoromethyl-2-perfluoroethylethyl (meth)acrylate, 2-perfluoroexylethyl (meth)acrylate, 2-perfluorodecylethyl (meth)acrylate, and 2-perfluorohexadecylethyl (meth)acrylate. Such a (meth)acrylate ester monomer can be copolymerized with any of the following vinyl monomers to form the (meth)acrylate ester polymer. Examples of the vinyl monomer include styrene monomers such as styrene, vinyltoluene, α-methylstyrene, chlorostyrene, and styrenesulfonic acid and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol. Each of these may be used alone, or a plurality of these may be used for copolymerization. Among these, polymers formed from styrene monomers and (meth)acrylate monomers are preferable in terms of physical properties of the product to be produced, for example. More preferable are (meth)acrylate ester polymers formed from acrylate ester monomers and methacrylate ester monomers, and particularly preferable are acrylate ester polymers formed from acrylate ester monomers. For applications such as general architectural applications, butyl acrylate monomers are still more preferable because the curable composition is required to have a low viscosity, and the coating film to be provided therefrom is required to have a low modulus, high elongation, high weather resistance, high heat resistance, and other properties. For applications such as automobile applications where properties such as oil resistance are required, copolymers mainly derived from ethyl acrylate are still more preferable. Such a polymer mainly derived from ethyl acrylate is likely to have slightly poor low-temperature properties (cold resistance) while having excellent oil resistance. In order to improve the low-temperature properties, a part of ethyl acrylate monomers used may be replaced with butyl acrylate monomers. As the proportion of butyl acrylate is increased, however, the good oil resistance is likely to be impaired. Thus, the proportion thereof is preferably 40% or lower, and more preferably 30% or lower, in the applications requiring good oil resistance. In order to improve properties such as low-temperature properties without impairment of oil resistance, it is also preferable to use a compound such as 2-methoxyethyl acrylate or 2-ethoxyethyl acrylate in which an oxygen atom is introduced in a side-chain alkyl group. Here, the cured product to be provided is likely to have poor heat resistance due to introduction of an alkoxy group having an ether bond in the side chain. Thus, the proportion of such a compound is preferably 40% or lower in the applications requiring good heat resistance. An optimum polymer can be obtained by adjusting the proportion in consideration of required physical properties, such as oil resistance, heat resistance, and low-temperature properties, according to various applications and requirements. For example, without any limitative meaning, copolymers of ethyl acrylate/butyl acrylate/2-methoxyethyl acrylate (weight ratio: 40 to 50/20 to 30/30 to 20) have physical properties such as oil resistance, heat resistance, and low-temperature properties in an excellent balance. In the present invention, these preferable monomers may be copolymerized or even block-copolymerized with another monomer. In such a case, the proportion of these preferable monomers is preferably 40% by weight or more. The above expression of a (meth)acrylic acid, for example, represents an acrylic acid and/or methacrylic acid.

The synthetic method of a (meth)acrylate ester polymer is not particularly limited, and may be a known method. Here, ordinary free radical polymerization, in which a compound such as an azo compound or a peroxide is used as a polymerization initiator, is disadvantageously likely to provide a polymer generally having a molecular weight distribution value as high as not lower than 2 and a higher viscosity. Thus, the living radical polymerization is preferable in order to obtain a (meth)acrylate ester polymer having a narrow molecular weight distribution, a low viscosity, and a high proportion of cross-linkable functional groups at molecular chain ends.

A method more preferable for producing a (meth)acrylate ester polymer containing a specific functional group among the "living radical polymerization" methods is the "atom transfer radical polymerization" in which (meth)acrylate ester monomers are polymerized with an organic halide or sulfonyl halide compound as an initiator and a transition metal complex as a catalyst. This is because the atom transfer radical polymerization provides a polymer terminally having a halogen or the like group which is relatively advantageous to functional-group exchange reactions, and gives a high degree of freedom in selecting an initiator and a catalyst, as well as having the characteristics of the "living radical polymerization". Examples of the atom transfer radical polymerization include the method described in Matyjaszewski et al., Journal of the American Chemical Society (*J. Am. Chem. Soc.*), 1995, vol. 117, p. 5614.

A reactive silyl group-containing (meth)acrylate ester polymer may be produced by any method. Examples thereof include the free radical polymerization with a chain transfer agent, as disclosed in JP-B H3-14068, JP-B H4-55444, JP-A H6-211922, and other documents; and the atom transfer radical polymerization disclosed in JP-A H9-272714 and other documents.

One species of the reactive silyl group-containing (meth)acrylate ester polymer may be used alone, or two or more species thereof may be used in combination.

The method of producing an organic polymer including a blend of a reactive silyl group-containing polyoxyalkylene polymer and a reactive silyl group-containing (meth)acrylate ester polymer has been proposed in JP-A S59-122541, JP-A S63-112642, JP-A H6-172631, JP-A H11-116763, and other documents, and is not particularly limited thereto. Preferable specific examples thereof include a production method by blending a reactive silyl group-containing polyoxyalkylene polymer with a copolymer containing a reactive silyl group and substantially comprising, in the molecular chain, a (meth)acrylate ester monomer unit containing a C1 to C8 alkyl group, as represented by the following formula (3):

$$—CH_2—C(R^6)(COOR^7)—\quad(3)$$

(wherein $R^6$ is a hydrogen atom or a methyl group, and $R^7$ represents a C1 to C8 alkyl group); and a (meth)acrylate ester monomer unit containing a C10 or higher alkyl group, as represented by the following formula (4):

$$—CH—C(R^6)(COOR^8)—\quad(4)$$

(wherein $R^6$ is the same as defined above, and $R^8$ is a C10 or higher alkyl group).

Examples of $R^7$ in formula (3) include C1 to C8, preferably C1 to C4, and more preferably C1 or C2 alkyl groups such as a methyl group, an ethyl group, a propyl group, an n-butyl group, a t-butyl group, and a 2-ethylhexyl group. One alkyl group may be used for $R^7$, or two or more alkyl groups may be used in combination.

Examples of $R^8$ in formula (4) include long-chain alkyl groups having 10 or more carbon atoms, commonly 10 to 30 carbon atoms, and preferably 10 to 20 carbon atoms, such as a lauryl group, a tridecyl group, a cetyl group, a stearyl group, and a behenyl group. Here, one alkyl group may be used for $R^8$, or two or more alkyl groups may be used in combination as in the case of $R^7$.

The (meth)acrylate ester polymer substantially comprises the monomer units defined by formulas (3) and (4) in the molecular chain. The term "substantially" herein means that the total amount of the monomer units defined by formulas (3) and (4) in the copolymer is more than 50 wt %. The total amount of the monomer units defined by formulas (3) and (4) in the copolymer is preferably not less than 70 wt %.

The ratio between the monomer units of formula (3) and formula (4) in the copolymer is preferably 95:5 to 40:60, and more preferably 90:10 to 60:40 in terms of the weight ratio.

Examples of monomer units which may be contained in the copolymer, other than the ones of formulas (3) and (4), include monomer units derived from: acrylic acids such as acrylic acid and methacrylic acid; amide group-containing monomers such as acrylamide, methacrylamide, N-methylolacrylamide, and N-methylolmethacrylamide; epoxy group-containing monomers such as glycidyl acrylate and glycidyl methacrylate; amino group-containing monomers such as diethylaminoethyl acrylate, diethylaminoethyl methacrylate, and aminoethyl vinyl ether; and other monomers such as acrylonitrile, styrene, α-methylstyrene, alkyl vinyl ethers, vinyl chloride, vinyl acetate, vinyl propionate, and ethylene.

The method of producing a polyoxyalkylene polymer obtained by blending a reactive silyl functional group-containing (meth)acrylate ester polymer may also be a method of polymerizing a (meth)acrylate ester monomer in the presence of a reactive silyl group-containing polyoxyalkylene polymer. This production method is specifically disclosed in JP-A S59-78223, JP-A S59-168014, JP-A S60-228516, JP-A S60-228517 and other documents, but is not limited thereto.

The organic polymer (I) used in the present invention which has less than one hydrolyzable silyl group per molecule on average and contains 5 to 80 wt % of oxyethylene units is used as a reactive plasticizer for the reactive silyl group-containing organic polymer (II). Examples of the organic polymer (I) include polyoxyethylene-polyoxypropylene copolymers and polyoxypropylene-polyoxybutylene copolymers. Among these, polyoxyethylene-polyoxypropylene copolymers are preferable, and block copolymers are particularly preferable.

In particular, the minimum amount of the ethylene oxide units in the organic polymer (I) is preferably not less than 5 wt %, more preferably not less than 15 wt %, and still more preferably not less than 30 wt %. The maximum amount of the ethylene oxide units is preferably not more than 80 wt %, more preferably not more than 65 wt %, and still more preferably not more than 50 wt %. An amount of less than 5 wt % is not preferable because the moisture permeability decreases, and an amount of more than 80 wt % is not preferable because the compatibility with the reactive silyl group-containing organic polymer (II) decreases.

The number of the reactive silyl groups in the organic polymer (I) is less than one per molecule of the polymer on average; here, the number of the reactive silyl groups is preferably from not less than 0.6 to less than 1, more preferably from not less than 0.7 to less than 1, and still more preferably from not less than 0.8 to less than 1. Less than 0.6 reactive silyl groups are not preferable because the amount of the organic polymer free of the reactive silyl group is large and thus the uncured material may exude to the product surface and its surrounding area.

The average number of the reactive silyl groups in the organic polymers (I) and/or (II) is defined as the average number based on the determination of protons on carbons each having the reactive silyl group directly bonded thereto by high-resolution $^1$H-NMR. The average number of the reactive silyl groups in the organic polymers (I) and/or (II) is calculated in consideration of the organic polymer precursors into which no silyl group has been introduced after the reactive silyl group introduction reaction, and the modified organic polymer precursors in which no reactive silyl group has been introduced and which are by-products produced after the reaction (i.e., including these in the population parameter (the number of molecules) in calculation of the average number of the reactive silyl groups per molecule).

The reactive silyl group of the organic polymers (I) and/or (II) may exist as a side chain inside the molecular chain, or may exist at the end. In the case that the reactive silyl group exist as a side chain, the effective network size in the resulting cured product decreases, and thereby a rubbery cured product having a high elastic modulus and a low elongation at break is likely to be obtained. On the other hand, in the case that the reactive silyl group is in the vicinity of the end of the molecular chain, the effective network size in the resulting cured product increases, and thereby a rubbery cured product having high strength and a high elongation at break is likely to be obtained. In particular, preferable is the case that the reactive silyl group is at the end of the molecular chain. In this case, the effective network size in the resulting cured product is the largest; hence, the cured product exhibits high elongation at break and rubber elasticity excellent in flexibility as the tensile properties. One species of the reactive silyl group-containing polyoxyalkylene polymer may be used alone, or two or more species thereof may be used in combination.

The reactive silyl group-containing organic polymer (I) is preferably produced from a compound having one active hydrogen as a starting material. The starting material may be a monovalent alcohol, a monovalent phenol, a monovalent carboxylic acid, a monovalent active hydrogen-containing compound containing an unsaturated group, such as an unsaturated alcohol, an unsaturated phenol, or an unsaturated carboxylic acid. Examples thereof include compounds represented by formula (5):

$$R^9\text{—OH} \quad (5)$$

(wherein $R^9$ is a monovalent organic group which includes at least one constituent atom selected from the group consisting of carbon, hydrogen, oxygen, and nitrogen, and contains no unsaturated group).

The monovalent active hydrogen-containing compound used as an initiator in the aforementioned polymerization is preferably a monovalent alcohol, more preferably a monovalent aliphatic alcohol, and particularly preferably a monovalent saturated aliphatic alcohol, in terms of easiness of the polymerization.

Examples thereof include aliphatic alcohols such as methyl alcohol, ethyl alcohol, n-propyl alcohol, isopropyl alcohol, n-butyl alcohol, t-butyl alcohol, isobutyl alcohol, n-amyl alcohol, isoamyl alcohol, hexyl alcohol, 2-ethylhexyl alcohol, heptanol, octanol, nonanol, undecanol, and allyl alcohol; and aromatic alcohols such as phenol, cresol, octylphenol, nonyl phenol, and benzyl alcohol.

The minimum molecular weight of the reactive silyl group-containing organic polymer (I) is preferably 500, more preferably 1,000, and still more preferably 2,000. The maximum molecular weight thereof is preferably 15,000, more preferably 10,000, and still more preferably 7,000. A molecular weight of less than 500 is not preferable in terms of cost because the amount of the reactive silyl group-containing compound to be reacted with the precursor of the organic polymer (I) increases. Such a molecular weight is not preferable also because a condensate of the organic polymer (I) having a comparatively low molecular weight, which is produced by reaction of only the reactive silyl group-containing organic polymers (I), and the unreacted organic polymer (I) may exude to the product surface and its surrounding area. On the other hand, a molecular weight of more than 15,000 is not preferable because the viscosity of the reactive silyl group-containing organic polymer (I) is so high that the handleability tends to decrease, and if the organic polymer contains a large amount of oxyethylene units, the compatibility with the reactive silyl group-containing organic polymer (II) decreases. Here, one species of the reactive silyl group-containing organic polymer (I) may be used alone, or multiple species thereof may be used in combination.

The molecular weight of the reactive silyl group-containing organic polymers (I) and/or (II) is defined as the molecular weight (terminal group-based molecular weight) corresponding to the number average molecular weight determined by directly measuring the terminal group concentration of the organic polymer precursor (e.g. hydroxy group-terminated polyoxyalkylene polymer) before the reactive silyl group introduction by titrimetric analysis based on the principles of the method of measuring the hydroxyl value according to JIS K 1557 and the method of measuring the iodine value according to JIS K 0070, followed by determination in consideration of the structure (branching degree determined based on the polymerization initiator used) of the organic polymer. The method of measuring the molecular weight of the organic polymers (I) and/or (II) may alternatively be performed by preparing a calibration curve of the polystyrene-equivalent number average molecular weight (GPC molecular weight) obtained by general GPC measurement of the organic polymer precursor and the above-defined terminal group-based molecular weight, and then converting the GPO molecular weight of each of the organic polymers (I) and (II) into a terminal group-based molecular weight.

The number of the reactive silyl groups in the organic polymer (II) is not less than 1, preferably not less than 1.2, more preferably not less than 1.3, and still more preferably not less than 1.4, per molecule of the polymer on average. The maximum number is not particularly limited, and is preferably not more than 3.0, more preferably not more than 2.4, and still more preferably not more than 2.1. The curability is insufficient if the number of the reactive silyl groups per molecule on average is less than 1, while good mechanical properties are not obtained if the number is so large that the network structure becomes excessively dense.

Examples of the organic polymer (II) include organic polymers such as polyoxypropylene polymers, polyoxybutylene polymers, polyisobutylene polymers, (meth)acrylate ester copolymers, and mixtures of these polymers. Among these, polyoxypropylene polymers are preferable.

The minimum amount of the molecular weight of the reactive silyl group-containing organic polymer (II) is preferably 2,000, more preferably 5,000, and still more preferably 10,000. The maximum amount thereof is preferably 50,000, more preferably 30,000, and still more preferably 25,000. If the molecular weight is less than 2,000, the elongation at break of the cured product to be obtained from the reactive silyl group-containing organic polymer tends to decrease. If the molecular weight is more than 50,000, the concentration of the cross-linkable functional group (reactive silyl group concentration) is so low that the curing rate tends to decrease; also in this case, the viscosity of the organic polymer is so high that the handleability tends to decrease. One species of the reactive silyl group-containing organic polymer (II) may be used alone, or multiple species thereof may be used in combination.

The reactive silyl group-containing organic polymer (II) may be straight chain or branched. In the case of the same molecular weight, a straight-chain organic polymer gives a higher elongation at break to the cured product compared to a branched organic polymer, but in this case, the viscosity of the uncured composition is higher and thus the handleability tends to be low.

The molecular weight distribution (Mw/Mn) of the reactive silyl group-containing organic polymers (I) and/or (II) is preferably low, as low as not higher than 2.0, and more preferably not higher than 1.5, in terms of reducing the viscosity. The molecular weight distribution (Mw/Mn) is measured by GPC (polystyrene equivalent).

The minimum amount of the reactive silyl group-containing organic polymer (I) is preferably 5 parts by weight, more preferably 10 parts by weight, and still more preferably 20 parts by weight, relative to 100 parts by weight of the reactive silyl group-containing organic polymer (II). The maximum amount thereof is preferably 200 parts by weight, more preferably 150 parts by weight, and still more preferably 100 parts by weight. If the amount is less than 5 parts by weight, the effect as a plasticizer is less likely to be achieved. If the amount is more than 200 parts by weight, the mechanical strength of the cured product tends to be insufficient. The reactive silyl group-containing organic polymer (I) may be blended in production of a curable composition. The reactive silyl group-containing organic polymer (I) may alternatively be mixed with the reactive silyl group-containing organic polymer (II) or another additive prior to the production.

The molecular weight of the reactive silyl group-containing organic polymer (I) in the curable composition of the present invention is preferably smaller than that of the reactive silyl group-containing organic polymer (II) in terms of reducing the viscosity, and is preferably not more than ½ of the molecular weight of the reactive silyl group-containing organic polymer (II) in terms of workability of the composition at low temperatures.

A curing catalyst can be added in the curable composition of the present invention. Specific examples thereof include metal salts of carboxylic acids, such as tin 2-ethylhexanoate, tin versatate, and bismuth 2-ethylhexanoate; carboxylic acids such as 2-ethylhexanoic acid and versatic acid; quadrivalent organotin compounds such as dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonyl phenoxide), dibutenyltin oxide, dibutyltin bis(acetylacetonate), dibutyltin bis(ethylacetoacetate), dioctyltin bis(acetylacetonate), reaction products of silicate compounds and dialkyl oxides such as dibutyltin oxide and dioctyltin oxide, reaction products of silicate compounds and dialkyltin dicarboxylates such as dibutyltin dilaurate and dioctyltin dilaurate, and reaction products of phthalate esters and dibutyltin oxide or dioctyltin oxide; organic titanates such as tetraisopropoxy titanium, tetra-n-butoxy titanium, diisopropoxytitanium bis(acetyl acetonate), and diisopropoxytitanium bis(ethylacetoacetate); organoaluminum compounds such as aluminum tris(acetylacetonate), aluminum tris(ethylacetoacetate), and diisopropoxyaluminum ethylacetoacetate; zirconium compounds such as zirconium tetrakis(acetylacetonate); aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, bis(2-ethylhexyl) amine, didecylamine, dilaurylamine, dicetylamine, distearylamine, methylstearyiamine, ethylstearylamine, and butylstearylamine; aliphatic tertiary amines such as triamylamine, trihexylamine, and trioctylamine; aliphatic unsaturated amines such as triallylamine and oleylamine; aromatic amines such as laurylaniline, stearylaniline, and triphenylamine; and other amines such as moncethanolamine, diethanolamine, triethanolamine, 3-hydroxypropylamine, diethylenetriamine, triethylenetetramine, benzylamine, 3-methoxypropylamine, 3-lauryloxypropylamine, 3-dimethylaminopropylamine, 3-diethylaminopropylamine, xylylenediamine, ethylenediamine, hexamethylenediamine, triethylenediamine, guanidine, diphenylguanidine, 2,4,6-tris (dimethylaminomethyl)phenol, morpholine, N-methylmorpholine, 2-ethyl-4-methylimidazole, 1,8-diazabicyclo(5.4.0) undecene-7 (DBU), and 1,5-diazabicyclo(4.3.0)nonene-5 (DBN). Among these, tin catalysts and basic catalysts are particularly preferable.

The amount of the curing catalyst is 0.01 to 10 parts by weight, preferably 0.1 to 7 parts by weight, and more preferably 0.5 to 4 parts by weight, relative to 100 parts by weight of the reactive silyl group-containing organic polymer (II).

The curable composition of the present invention may contain a silane coupling agent (e.g. amino group-containing silane coupling agent), a reaction product of a silane coupling agent, or a compound other than a silane coupling agent, as an adhesion-imparting agent. An amino group-containing silane coupling agent is a compound containing a hydrolyzable silyl group and an amino group, which improves the adhesion of the curable composition of the present invention and increases the moisture permeability of the cured product. Specific examples of the hydrolyzable group include groups already mentioned as hydrolyzable groups, and groups such as methoxy and ethoxy are preferable in terms of the hydrolysis rate. The number of the hydrolyzable groups is preferably 2 or more, and particularly preferably 3 or more. As the amino group, primary amino groups are more preferable among amino groups because they provide larger effect of improving the adhesion.

Specific examples of the amino group-containing silane coupling agent include γ-aminopropyl trimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriispropoxysilane, γ-(6-aminohexyl)aminopropyltrimethoxylsilane, 3-(N-ethylamirno)-2-methylpropyltrimethoxysilane, 2-aminoethylaminomethyltrimethoxysilane, N-cyclohexylaminomethyltriethoxysilane, N-cyclohexlaminomethyldiethoxymethylsilane, γ-ureidopropyltrimethoxysilane, γ-ureidopropyltriethoxysilane, N-phenyl-γ-aminopropyltrimethoxysilane, N-phenylaminomethyltrimethoxysilane, N-benzyl-γ-aminopropyltrimethoxysilane, N-vinylbenzyl-γ-aminopropyltriethoxysilane, N,N'-bis[3-(trimethoxysilyl)propyl]ethylenediamine, N-cyclohexylaminomethyltriethoxysilane, N-cyclohexylaminomethyldiethoxymethylsilane, and N-phenylaminomethyltrimethoxysilane.

The amount thereof is 0.1 to 20 parts by weight, and preferably 1 to 10 parts by weight, relative to 100 parts by weight of the reactive silyl group-containing organic polymer (II). If the amount is less than the above range, the adhesion and the moisture permeability may not be sufficiently improved. If the amount is more than the above range, the elongation of the cured product tends to be low and the depth curability tends to decrease.

Specific examples of other silane coupling agents include isocyanato group-containing silanes such as γ-isocyanatopropyltrimethoxysilane, γ-isocyanatpropropyltriethoxysilane, γ-isocyanatopropylmethyldiethoxysilane, γ-isocyanatpropropylmethyldimethoxysilane, (isocyanatomethyl)trimethoxysilane, (isocyanatomethyl)dimethoxymethylsilane, (isocyanatomethyl)triethoxysilane, and (isocyanatomethyl)diethoxymethylsilane; ketimine silanes such as N-(1,3-dimethylbutylidene)-3-(triethoxysilyl)-1-propaneamine; mercapto group-containing silanes such as γ-mercaptopropyltrimethoxysilane, γ-mercaptopropyltriethoxysilane, γ-mercaptpropylmethyldimethoxysilane, γ-mercaptopropylmethyldiethoxysilane, mercaptomethyltrimethoxysilane, and mercaptomethyltriethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl) ethyltrimethoxysilane, and β-(3,4-epoxycyclohexyl) ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl unsaturated group-containing silanes such as vinyltrimethoxysilane, vinyltriethoxysilane, vinyldimethylmethoxysilane, γ-methacryloyoxypropylmethyldimethoxysilane, γ-acryloyloxypropyltriethoxysilane, and methacryloyloxymethyltrimethoxysilane; halogen-containing silanes such as γ-chloropropyltrimethoxysilane; and isocyanurate silanes such as tris(3-trimethoxysiylpropyl)isocyanurate. Also, derivatives produced by modifying these, such as amino-modified silyl polymers, silylated amino polymers, unsaturated aminosilane complexes, phenylamino-long chain alkylsilanes, aminosilylated silicones, and silylated polyesters, can be used as silane coupling agents. Examples of the reaction product of a silane coupling agent include reaction products of the aforementioned aminosilanes and epoxysilanes, reaction products of aminosilanes and isocyanate silanes, and partial condensates of various silane coupling agents.

The amount of the other silane coupling agents is preferably about 0.1 to 15 parts by weight, more preferably about 1 to 10 parts by weight, and particularly preferably about 3 to 7 parts by weight, relative to 100 parts by weight of the reactive silyl group-containing organic polymer (II). If the amount is less than the above range, the adhesion and the storage stability may be insufficient. If the amount is more than the above range, film-forming properties may be insufficient.

The curable composition of the present invention may contain a filler. Examples of the filler include reinforcing fillers such as fumed silica, precipitated silica, crystalline silica, fused silica, dolomite, silicic anhydride, hydrous silicic acid, and carbon black; fillers such as heavy calcium carbonate, colloidal calcium carbonate, magnesium carbonate, diatomite, calcined clay, clay, talc, titanium oxide, bentonite, organic bentonite, ferric oxide, fine aluminum powder, flint powder, zinc oxide, activated zinc white, shirasu balloons, glass microballoons, organic microballoons of phenol resin, vinylidene chloride resin, or acrylonitrile copolymer resin, and resin powders including PVC powder and PMMA powder; and fibrous fillers such as asbestos, glass fiber, and filaments. Among these, heavy calcium carbonate and colloidal calcium carbonate are preferable in terms of cost and viscosity. In the case of using a filler, the amount thereof is 1 to 250 parts by weight, and preferably 10 to 200 parts by weight, relative to 100 parts by weight of the reactive silyl group-containing organic polymer (II).

The curable composition of the present invention may contain a physical-property modifier for adjusting the tensile properties of the cured product to be obtained, if necessary. Examples of the physical-property modifier include, but not particularly limited to, alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane and methyltriisopropenoxysilane; alkoxysilanes containing a functional group, such as γ-glycidoxypropylmethyldiisopropenoxysilane; silicone varnishes; and polysiloxanes. Use of the physical-property modifier enables to increase the hardness of a cured product of the composition of the present invention, or alternatively to decrease the hardness to increase the elongation at break. One physical-property modifier may be used alone, or two or more physical-property modifiers may be used in combination.

Particularly, a compound that generates a compound containing a monovalent silanol group in a molecule by hydrolysis provides an effect of reducing the modulus of the cured product to be provided without disadvantageously increasing the surface stickiness thereof. Particularly preferable is a compound generating trimethylsilanol. Examples of such a compound that generates a compound containing a monovalent silanol group in a molecule by hydrolysis include compounds as disclosed in JP-A H5-117521. The examples also include compounds that are derivatives of alkyl alcohols such as hexanol, octanol, and decanol, and generate silicon compounds $R_3SiOH$ such as trimethylsilanol by hydrolysis; and compounds that are derivatives of polyalcohols containing three or more hydroxy groups per molecule, such as trimethylolpropane, glycerol, pentaerythritol, and sorbitol, and generate silicon compounds $R_3SiOH$ such as trimethylsilanol by hydrolysis, as disclosed in JP-A H11-241029.

The examples further include compounds that are derivatives of oxyalkylene polymers, and generate silicon compounds $R_3SiOH$ such as trimethylsilanol by hydrolysis, as disclosed in JP-A H7-258534; and polymers as disclosed in JP-A H6-279693 which contain a hydrolyzable silyl group that can be cross-linked and a silyl group that can form a monosilanol-containing compound by hydrolysis.

The amount of the physical-property modifier is 0.1 to 20 parts by weight, and preferably 0.5 to 10 parts by weight, relative to 100 parts by weight of the reactive silyl group-containing organic polymer (II).

The curable composition of the present invention may contain a plasticizer other than the reactive silyl group-containing organic polymer (I). The "plasticizer" herein is defined as a compound that has a vapor pressure at 20° C. of lower than 0.01 kPa, is not reactive with the reactive silyl group-containing organic polymer (II), and can plasticize the reactive silyl group-containing organic polymer (II). Addition of the plasticizer enables to adjust the mechanical properties such as the viscosity and slump properties of the curable composition, and the tensile strength and elongation of the coating film obtainable by curing the curable composition. Examples of the plasticizer include phthalate esters such as dibutyl phthalate, diheptyl phthalate, di(2-ethylhexyl)phthalate, and butyl benzyl phthalate; esters of non-aromatic dibasic acids such as dioctyl adipate, dioctyl sebacate, dibutyl sebacate, and isodecyl succinate; aliphatic esters such as butyl oleate and methyl acetylricinoleate; phosphate esters such as tricresyl phosphate and tributyl phosphate; trimellitate esters; chlorinated paraffins; hydrocarbon oils such as alkyldiphenyls and partially hydrogenated terphenyls; process oils; and epoxy plasticizers such as epoxidized soybean oil and benzyl epoxystearate.

Also, polymer plasticizers other than the reactive silyl group-containing organic polymer (I) can be used. In the case of using a polymer plasticizer, the initial physical properties can be maintained for a long period of time compared to the case of using a low-molecular weight plasticizer. The drying properties (also referred to as coating properties) of an alkyd coating material applied to the coating film can also be improved. Specific examples of the polymer plasticizer include polyoxyalkylene polymers containing no reactive silyl group, which can be obtained by polymerization of a single or multiple compounds such as aliphatic alkylene oxides (e.g. ethylene oxide, propylene oxide, 1,2-butylene oxide, 2,3-butylene oxide, epichlorohydrin, tetramethylene oxide) and aromatic alkylene oxides (e.g. styrene oxide) by any of the above methods (e.g. polymerization method using an alkali catalyst such as KOH; polymerization method using a catalyst of a transition metal compound-porphyrin complex such as a complex obtainable by reacting an organoaluminum compound and porphyrin; polymerization method using a double metal cyanide complex catalyst; polymerization method using a catalyst containing a polyphosphazene salt; and polymerization method using a catalyst containing a phosphazene compound); vinyl polymers obtained by polymerizing vinyl monomers by various methods; esters of polyalkylene glycols, such as diethylene glycol dibenzoate, triethylene glycol dibenzoate, and pentaerythritol ester; polyester plasticizers obtainable from dibasic acids (e.g. sebacic acid, adipic acid, azelaic acid, phthalic acid) and divalent alcohols (e.g. ethylene glycol, diethylene glycol, triethylene glycol, propylene glycol, dipropylene glycol); polystyrenes such as polystyrene and poly-α-methylstyrene; polybutadiene, polybutene, polyisobutylene, polybutadiene-acrylonitrile, and polychloroprene.

Among these polymer plasticizers, ones compatible with the reactive silyl group-containing organic polymer (II) are preferable. In this context, polyoxyalkylene polymers and vinyl polymers which contain no reactive silyl group are preferable. Further, in terms of the compatibility, weather resistance, and heat resistance, vinyl polymers are preferable. Among the vinyl polymers, acrylic polymers and/or methacrylic polymers are preferable, and acrylic polymers such as polyacrylic acid alkyl ester are more preferable. The synthesis method of these polymers is preferably the living radical polymerization, and more preferably the atom transfer radical polymerization because such methods provide polymers having a narrow molecular weight distribution and a low viscosity. Also preferable are polymers produced by the so-called SGO process in which acrylic acid alkyl ester monomers are continuously bulk-polymerized under high-temperature and high-pressure conditions, as disclosed in JP-A 2001-207157.

The molecular weight of the polymer plasticizer is preferably 500 to 15,000, more preferably 800 to 10,000, still more preferably 1,000 to 8,000, particularly preferably 1,000 to 5,000, and most preferably 1,000 to 3,000. If the molecular weight is too low, the plasticizer exudes due to heat or rain over time, and therefore the initial physical properties cannot be maintained for a long period of time and the alkyd coating properties cannot be improved. If the molecular weight is too high, the viscosity becomes high and the workability is deteriorated. The molecular weight distribution of the polymer plasticizer is not particularly limited but is preferably narrow; the molecular weight distribution is preferably less than 1.8, more preferably not more than 1.7, still more preferably not more than 1.6, even more preferably not more than 1.5, particularly preferably not more than 1.4, and most preferably not more than 1.3.

In the case of a vinyl polymer, the molecular weight and the molecular weight distribution (Mw/Mn) are measured by the GPC method (polystyrene equivalent).

One plasticizer may be used alone, or two or more plasticizers may be used in combination. Also, a low-molecular weight plasticizer and a polymer plasticizer may be used in combination. The plasticizer can also be added at the time of polymer production.

The curable composition of the present invention may contain a thixotropic agent (anti-sagging agent) to prevent sagging and improve the workability, if necessary. Examples of the anti-sagging agent include, but not particularly limited to, polyamide waxes, hydrogenated castor oil derivatives; and metal soaps such as calcium stearate, aluminum stearate, and barium stearate. Further, use of powdery rubber having a particle size of 10 to 500 μm as disclosed in JP-A H11-349916 or organic fiber as disclosed in JP-A 2003-155389 enables to obtain a curable composition being highly thixotropic and having good workability. One of these thixotropic agents (anti-sagging agents) may be used alone, or two or more of these may be used in combination. The amount of the thixotropic agent is in the range of 0.1 to 20 parts by weight relative to 100 parts by weight of the reactive silyl group-containing organic polymer (II).

The curable composition of the present invention may contain various additives if necessary. Examples of the additives include photo-curable substances, oxygen-curable substances, antioxidants, light stabilizers, ultraviolet absorbers, epoxy resins, epoxy resin curing agents, frame retardants, solvents, curability modifiers, radical inhibitors, metal deactivators, antiozonants, phosphorus type peroxide decomposers, lubricants, pigments, blowing agents, repellents for ants, and antifungal agents. Each of these additives may be used alone or two or more of these may be used in combination. Specific examples of the various additives include ones as disclosed in JP-B H4-69659, JP-B H7-108928, JP-A 563-254149, JP-A 564-22904, JP-A 2001-72854, and JP-A 2008-303650.

The curable composition of the present invention may contain an antioxidant (age resistor). Use of the antioxidant enables to increase the weather resistance of the cured product. Examples of the antioxidant include hindered phenol antioxidants, monophenol antioxidants, bisphenol antioxidants, and polyphenol antioxidants. Particularly preferable are hindered phenol antioxidants. Similarly, the following hindered amine light stabilizers can be used: Tinuvin 622LD and Tinuvin 144; CHIMASSORB 944LD, CHIMASSORB 119FL (all are products of Ciba Japan K.K.); Adekastab LA-57, Adekastab LA-62, Adekastab LA-67, Adekastab LA-63, and Adekastab LA-68 (all are products of ADEKA Corporation); and SANOL LS-770, SANOL LS-765, SANOL LS-292, SANOL LS-2626, SANOL LS-1114, and SANOL LS-744 (all are products of Sankyo Lifetech Co., Ltd.). Specific examples of the antioxidant include ones disclosed in JP-A H4-283259 and JP-A H9-194731. The amount of the antioxidant is preferably 0.1 to 10 parts by weight, and more preferably 0.2 to 5 parts by weight, relative to 100 parts by weight of the reactive silyl group-containing organic polymer (II).

The curable composition of the present invention may contain a light stabilizer. Use of the light stabilizer enables to prevent photooxidative deterioration of the cured product. Examples of the light stabilizer include benzotriazole compounds, hindered amine compounds, and benzoate compounds. Particularly preferable among these are hindered amine compounds. The amount of the light stabilizer is preferably 0.1 to 10 parts by weight, and more preferably 0.2 to 5 parts by weight, relative to 100 parts by weight of the reactive silyl group-containing organic polymer (II). Specific examples of the light stabilizer include those as disclosed in JP-A H-194731.

In the case that the curable composition of the present invention contains a photo-curable substance, particularly an unsaturated acrylic compound, then a tertiary amine-containing hindered amine light stabilizer is preferably used as the hindered amine light stabilizer as taught in JP-A H5-70531, in terms of improving the storage stability of the composition. Examples of the tertiary amine-containing hindered amine light stabilizer include Tinuvin 622LD and Tinuvin 144; CHIMASSORB 119FL (all are products of Ciba Japan K.K.); Adekastab LA-57, LA-62, LA-67, and LA-63 (all are products of ADEKA Corporation); and SANOL LS-765, LS-292, LS-2626, LS-1114, and LS-744 (all are products of Sankyo Lifetech Co., Ltd.).

The curable composition of the present invention may contain an ultraviolet absorber. Use of the ultraviolet absorber enables to increase the surface weather resistance of the cured product. Examples of the ultraviolet absorber include benzophenone compounds, benzotriazole compounds, salicylate compounds, substituted tolyl compounds, and metal chelate compounds. Particularly preferable among these are benzotriazole compounds. The amount of the ultraviolet absorber is preferably 0.1 to 10 parts by weight, and more preferably 0.2 to 5 parts by weight, relative to 100 parts by weight of the reactive silyl group-containing organic polymer (II). It is preferable to use a phenol or hindered phenol antioxidant, a hindered amine light stabilizer, and a benzotriazole ultraviolet absorber in combination.

The curable composition of the present invention can be prepared as a one-pack type curable composition which is prepared by compounding all the formulation components and storing the resulting composition in a hermetically-closed vessel in advance, and is curable by moisture in the air after application. Alternatively, the curable composition can be prepared as a two-pack type curable composition which includes, separately, a formulation mixture (curing agent) prepared by mixing such components as a curing catalyst, filler, plasticizer and water, and the base mixture of the curable composition which is to be mixed with the formulation mixture prior to application. In terms of workability, the one-pack type is preferable.

In the case of producing a one-pack type curable composition, since all the formulation components are mixed in advance, formulation components containing water are preferably dehydrated and dried prior to application or dehydrated, for example, under reduced pressure during the mixing and kneading. In the case of producing a two-pack type curable composition, since a curing catalyst is not required to be mixed in the base mixture including the reactive silyl group-containing organic polymer, the base mixture is less likely to be gelled even if containing a small amount of water; still, if long-term storage stability is required, the formulation components are preferably dehydrated and dried. Preferable examples of the dehydrating and drying method include: heat drying in the case that the formulation components are solids such as powder; and vacuum dehydration and dehydration using a substance such as synthetic zeolite, active alumina, silica gel, quick lime, and magnesium oxide in the case that the formulation components are liquids. Alternatively, the composition may be mixed with a small amount of an isocyanato compound such that an isocyanato group and water are reacted for dehydration. Yet alternatively, the composition may be mixed with an oxazolidine compound such as 3-ethyl-2-methyl-2-(3-methylbutyl)-1,3-oxazolidine so that the compound is reacted with water for dehydration. The storage stability can be further improved by, in addition to performing the dehydration and drying method, adding an lower alcohol such as methanol and ethanol; or an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, and γ-glycidoxypropyltrimethoxysilane.

The amount of the dehydrating agent, particularly a silicon compound reactive with water, such as vinyltrimethoxysilane, is 0.1 to 20 parts by weight, and preferably 0.5 to 10 parts by weight, relative to 100 parts by weight of the reactive silyl group-containing organic polymer (II).

The curable composition of the present invention may be prepared by any methods including commonly used methods. Examples thereof include a method in which the aforementioned components are mixed and kneaded at room temperature or under heating by a mixer, roller, kneader or the like; and a method in which the components are dissolved in a small amount of an appropriate solvent and then mixed.

The curable composition of the present invention forms a three-dimensional network structure due to the moisture effect when exposed to the air, being cured into a rubbery cured product.

Since the reactive silyl group-containing polyoxyalkylene polymer, an example of the reactive silyl group-containing organic polymer (II) in the present invention, has comparatively low viscosity, an applicable, non-aqueous and/or non-solvent (or high-solids, with a small amount of a solvent) composition can be easily designed. Since there is a problem that it takes a long time for an aqueous emulsion composition to form a coating film at low temperatures or high humidity and thus the composition has low workability in cold weather, the curable composition of the present invention is preferably a non-aqueous curable composition. Further, in terms of reducing environmental load, the curable composition of the present invention is preferably a non-solvent (or high-solids) curable composition.

In the case of a non-aqueous curable composition, the amount of water in the curable composition of the present invention is preferably not more than 10 parts by weight, more preferably not more than 1 part by weight, still more preferably not more than 0.1 parts by weight, and most preferably substantially zero, relative to 100 parts by weight of the reactive silyl group-containing organic polymer (II). In the case that the amount of water is more than the above range, the storage stability tends to decrease and the physical properties of the coating film may decrease.

In the case of a non-solvent curable composition, the amount of solvent in the curable composition of the present invention is preferably not more than 10 parts by weight, more preferably not more than 5 parts by weight, still more preferably not more than 1 part by weight, particularly preferably not more than 0.1 parts by weight, and most preferably substantially zero, relative to 100 parts by weight of the reactive silyl group-containing organic polymer (II). In the case that the amount of solvent is more than the above range, the amount of VOC at the time of formation of the coating film is large, which tends to increase the environmental load.

The curable composition of the present invention is preferably of the one-pack type because, for example, such a composition provides easy workability and does not show a decrease in the coating film properties which could be caused by insufficient mixing or an inappropriate mixture ratio.

The base to which the curable composition of the present invention is applied is not particularly limited, and specific examples thereof include inorganic bases such as concrete walls, concrete boards, concrete blocks, concrete masonry units (CMU), mortar boards, ALC panels, gypsum boards (e.g. Dens Glass Gold: product of Georgia Pacific), and slate boards, wood bases such as wood, laminated wood, and oriented strand boards (OSB), organic bases such as asphalt, modified bitumen, waterproof sheets such as EPDM and TPO, and urethane foam heat insulating materials, and metal bases such as metal panels.

The thickness of the coating film formed by curing the curable composition of the present invention is preferably 0.005 to 0.05 inches, and more preferably 0.01 to 0.04 inches. If the thickness of the coating film is less than the above range, the coating film properties such as long-term durability, waterproofness, and tear resistance tend to decrease. If the thickness of the coating film is more than the above range, the moisture permeability tends to decrease and the cost tends to increase.

The method of applying the curable composition of the present invention is not particularly limited, and may be a known application method such as methods using a brush, a roller, an air spray, and an airless spray, as disclosed in JP-A 10-298488.

The moisture permeability of the coating film formed by curing the curable composition of the present invention can be evaluated by the following method. That is, the curable composition of the present invention is formed into a sheet having a uniform thickness, cured for four days at 23° C. and 50% RH and then for three days at 50° C. The thickness of the obtained sheet-shaped cured product is measured by a micrometer, and the moisture permeance at 23° C. and 50% RH is measured in accordance with the wet cup method (also referred to as water method) described in ASTM E96. Here, the moisture permeance depends on the properties of the material used and the thickness of the sheet evaluated. It is difficult to give the same thickness to every sheet. Hence, the moisture permeability herein is a value that represents the moisture permeability of the material used and is substantially not dependent on the thickness of the sheet; such a value is calculated as $[\alpha \times \beta/1000]$(unit: perm-inch) using the moisture permeance $[\beta]$ (unit: perm) of the sheet-shaped cured product and the thickness $[\alpha]$(unit: mil) of the sheet-shaped cured product.

The moisture permeability of the coating film formed by curing the curable composition of the present invention is preferably not lower than 0.4 perm-inch, and more preferably not lower than 0.6 perm-inch. If the moisture permeability of the coating film is less than the above range, the permeation of the water vapor from the applied base is not enough, and problems may arise such as that dew condensation occurs around the base or mold grows.

The moisture permeance of the coating film formed by curing the curable composition of the present invention is preferably not lower than 17 perm, and more preferably not lower than 20 perm. In the case that the moisture permeance of the coating film is less than the above range, the permeation of the water vapor from the applied base is not enough, and problems may arise such as that dew condensation occurs around the base or mold grows.

<Applications>

The reactive silyl group-containing polyoxyalkylene polymer, an example of the reactive silyl group-containing organic polymer (II), has a comparatively low viscosity, and thus the curable composition of the present invention can be easily designed to have a viscosity suited for coating. Further, the cured product of the curable composition of the present invention has high moisture permeability, and has sufficient waterproofness for preventing entry of water from the outside. Therefore, the curable composition of the present invention is useful as a waterproof material for buildings, and particularly useful as a moisture-permeable waterproof coating material. The "moisture-permeable waterproof coating material" is a waterproof coating material that is liquid before curing and can be applied to the base using a brush, a spatula, a roller, or the like or applied by a spraying machine so as to be formed into a film and cured into a seamless waterproof layer, but also is moisture-permeable so as to be capable of releasing water from the base to the outside. The "waterproof coating material" has features including (i) having high waterproof reliability owing to the seamless coating film without joints; and (ii) being adaptable to locations with complicated shapes.

Conventional moisture-permeable waterproof sheets take advantage of their high moisture permeability and waterproofness, and are thus used as waterproof materials which, when applied to the external wall base, prevent entry of bulk water such as rainwater from the outside and prevent dew condensation on the external wall by releasing the water vapor from the external wall to the outside. The sheets are usually used in various kinds of business complexes, collective housing, single houses and the like, particularly buildings constructed by the external wall ventilation method. However, since nails and adhesive tapes are used for the overlapping portion of the moisture-permeable waterproof sheets, water sometimes enters the inside from the gaps between the sheets and the nails or adhesive tapes during long-term use, thereby damaging various building base materials such as steel frame and wood. The water vapor, contained in the external air passing through the gaps in the overlapping portion of the moisture-permeable waterproof sheets, and water condensed from the water vapor also largely damage various building base materials. Also, the external air entering the inside through the gaps is likely to change the temperature inside the building to decrease the temperature control efficiency, causing energy loss. Since the curable composition of the present invention can be applied as a liquid, and thus can be easily formed into a seamless coating film which can sufficiently prevent entry of water and air from the outside, the curable composition is particularly useful as a waterproof coating material for an external wall base of buildings.

The external wall base to which the curable composition of the present invention is applied is not particularly limited, and is preferably an inorganic base such as concrete walls, concrete boards, concrete blocks, concrete masonry units (CMU), mortar boards, ALC panels, gypsum boards (e.g. Dens Glass Gold: product of Georgia Pacific), and slate boards, a wood base such as wood, laminated wood, and oriented strand boards (OSB), or an organic base such as urethane foam heat insulating materials.

The method of applying the curable composition of the present invention to the external wall base is not particularly limited, and examples thereof include application methods using a brush, a roller, an air spray, and an airless spray. In terms of application efficiency particularly in the case of a large area, application by a roller, an air spray, or an airless spray is preferable.

The thickness of the coating film formed by applying the curable composition of the present invention to an external wall base and curing the composition is preferably 0.005 to 0.05 inches, more preferably 0.01 to 0.04 inches, still more preferably 0.015 to 0.035 inches, and particularly preferably 0.02 to 0.03 inches. If the thickness of the coating film is less than the above range, the coating film properties such as long-term durability, waterproofness, and tear resistance tend to decrease. If the thickness of the coating film is more than the above range, the moisture permeability tends to decrease and the cost tends to increase.

After application of the curable composition of the present invention to an external wall base and curing, various exterior finishing materials are applied. The exterior finishing method is not particularly limited, and preferable examples thereof in the case of the internal heat insulation include a method of applying the curable composition of the present invention to an external wall base, curing the composition, and finishing with a material such as stucco, coating materials, bricks, tiles, stones, siding boards, and metal panels. In the case of the external heat insulation, a preferable method is a method of applying the curable composition of the present invention to an external wall base, curing the composition, laying a heat insulating board, and finishing with a material such as stucco, coating materials, bricks, tiles, stones, siding boards, and metal panels.

The locations around openings (e.g. windows and doors) (such as the lower side of sashes and the periphery of window frames) of buildings have complicated shapes, and are difficult to be waterproofed. Accordingly, many of claims for water leakage are for leakage around openings. In order to prevent such water leakage, adhesive-backed waterproof tapes are sometimes used for locations such as the gaps between the moisture-permeable waterproof sheets, the overlapping portions of the sheets, and the ends of the sheets. However, since the adhesive layer of such a waterproof tape is formed from a rubber adhesive or asphalt adhesive, the moisture permeability of these locations greatly decreases, and the materials around openings such as windows and doors are sometimes corroded by dew condensation. Further, dew condensation causes mold which may contaminate the air inside the building and disturb the health of the resident or worker. The curable composition of the present invention is particularly useful as a moisture-permeable waterproof coating material for locations around openings of buildings because the composition can be applied as a liquid and can be easily adapted to the complicated shapes, and the cured coating film has sufficient waterproofness and moisture permeability. The curable composition of the present invention is also useful for locations around ducts, wall handrails, handrail corners, and the like.

The base to which the curable composition of the present invention is applied around openings of buildings is not particularly limited, and may be preferably a wood base such as wood, laminated wood, and oriented strand boards (OSB), or an inorganic base such as concrete boards, concrete blocks, concrete masonry units (CMU), mortar boards, ALC panels, gypsum boards (e.g. Dens Glass Gold: product of Georgia Pacific), and slate boards.

The method of applying the curable composition of the present invention to locations around openings of buildings is not particularly limited, and examples thereof include application methods using a brush, a roller, an air spray, and an airless spray. Particularly, application by a brush or a roller is preferable because coating unevenness is less likely to occur.

The thickness of the coating film formed by applying the curable composition of the present invention to locations around openings of buildings and curing the composition is preferably 0.005 to 0.05 inches, and more preferably 0.01 to 0.04 inches. If the thickness of the coating film is less than the above range, the coating film properties such as long-term durability, waterproofness, and tear resistance tend to decrease. If the thickness of the coating film is more than the above range, the moisture permeability tends to decrease and the cost tends to increase.

After application of the curable composition of the present invention to locations around openings of buildings and curing, various components such as windows, doors, and ducts are incorporated into the openings.

Since the curable composition of the present invention can form a jointless coating film and therefore has high reliability in waterproofness, the composition is particularly useful as a moisture-permeable waterproof coating material for roofs which requires high waterproofness. The "moisture-permeable waterproof coating material for roofs" of buildings is a waterproof material to be applied to the base for roofs such as roofing boards.

In addition to the above applications, the curable composition of the present invention may be used for, although not limited to, various applications including architectural and industrial sealants such as architectural elastic sealants, siding board sealants, double glass sealants, and vehicle sealants, electric and electronic part materials such as solar cell backside sealants, electrical insulation materials such as insulative coating materials for electric wires and cables, pressure-sensitive adhesives, adhesives, elastic adhesives, contact adhesives, tile adhesives, reactive hot melt adhesives, paints, powder paints, coating materials, foams, sealants for can tops and the like, radiation sheets, potting agents for electrics and electronics, films, gaskets, marine deck caulking, casting materials, various molding materials, artificial marble, rustproof, waterproof sealants for the edges (cut portions) of wire-reinforced glass and laminated glass, vibration proofing, vibration deadening, sound insulating, and quake-absorbing materials used for vehicles, boats and ships, and household appliances, and liquid sealants and waterproof materials used for automobile parts, electric parts, various machinery parts and the like.

EXAMPLES

The following specific examples illustrate the present invention in more detail. The examples are, however, not intended to limit the scope of the invention.

Synthesis Example 1

An ethylene oxide/propylene oxide block copolymer (50/50 in molar ratio) having a molecular weight of 2,400 was produced by polymerization in the presence of butanol as an initiator and an alkali metal catalyst (KOH). To the copolymer was added a solution of $NaOCH_3$ in methanol in an amount corresponding to 1.2 equivalents to hydroxy groups of the produced butoxy-monoterminated polyoxyalkylene monool, and the methanol was distilled off. Then, allyl chloride was added, and thereby each terminal hydroxy group was converted to an allyloxy group. To 600 g of the desalination-purified allyloxy-monoterminated polyoxypropylene polymer was added hexane as an azeotropic solvent, and the mixture was azeotropically dehydrated at 90° C. Then, the hexane was removed under reduced pressure, and the atmosphere was replaced by nitrogen. The resulting product was mixed with 120 μl of a solution of a platinum-vinylsiloxane complex in isopropanol (platinum content: 3 wt %), and the mixture was reacted with 27 g of dimethoxymethylsilane for six hours at 90° F. with stirring. The mixture was then deaerated under reduced pressure, and thereby a butoxy-monoterminated polyoxyalkylene polymer (A-1) containing a dimethoxymethylsilyl group (molecular weight of 2,400) was obtained. As a result of $^1$H-NMR measurement (measured in a CDCl$_3$ solvent with JNM-LA400 produced by JEOL Ltd.), the average number of dimethoxymethylsilyl groups per molecule was found to be 0.8.

Synthesis Example 2

An ethylene oxide/propylene oxide block copolymer (47/53 in molar ratio) having a molecular weight of about 1,500 was produced by polymerization in the presence of methanol as an initiator and an alkali metal catalyst (KOH). To the copolymer was added a solution of NaOCH$_3$ in methanol in an amount corresponding to 1.2 equivalents to hydroxy groups of the produced methoxy-monoterminated polyoxyalkylene monool, and the methanol was distilled off. Then, allyl chloride was added, and thereby each terminal hydroxy group was converted to an allyloxy group. To 600 g of the desalination-purified allyloxy-monoterminated polyoxypropylene polymer was added hexane as an azeotropic solvent, and the mixture was azeotropically dehydrated at 90° C. Then, the hexane was removed under reduced pressure, and the atmosphere was replaced by nitrogen. The resulting product was mixed with 120 μl of a solution of a platinum-vinylsiloxane complex in isopropanol (platinum content: 3 wt %), and the mixture was reacted with 49.8 g of dimethoxymethylsilane for six hours at 90° C. with stirring. The mixture was then deaerated under reduced pressure, and thereby a methoxy-monoterminated polyoxyalkylene polymer (A-2) containing a dimethoxymethylsilyl group (molecular weight of about 1,500) was obtained. As a result of $^1$H-NMR measurement (measured in a CDCl$_3$ solvent with JNM-LA400 produced by JEOL Ltd.), the average number of dimethometethylsilyl groups per molecule was found to be 0.8.

Synthesis Example 3

Propylene oxide was polymerized in the presence of polypropylene glycol as an initiator, a zinc hexacyanocobaltate glyme complex catalyst, and tetrahydrofuran to provide a hydroxy-terminated polyoxypropylene polymer having a molecular weight of about 10,000. To the hydroxy-terminated polyoxypropylene polymer was added a solution of NaOCH$_3$ in methanol in an amount corresponding to 1.2 equivalents to hydroxy groups of the polymer, and the methanol was distilled off. Then, allyl chloride was added, and thereby each terminal hydroxy group was converted to an allyloxy group. To 2,000 g of the desalination-purified allyloxy-terminated polyoxypropylene polymer were added 2,6-di-tert-butyl-p-cresol as an antioxidant and hexane as an azeotropic solvent, and the mixture was azeotropically dehydrated at 90° C. Then, the hexane was removed under reduced pressure, and the atmosphere was replaced by nitrogen. The resulting product was mixed with 100 μl of a solution of a platinum-vinylsiloxane complex in isopropanol (platinum content: 3 wt %), and the mixture was reacted with 35.4 g of dimethoxymethylsilane for two hours at 90° C. with stirring. The mixture was then deaerated under reduced pressure, and thereby a straight-chain polyoxypropylene polymer (B-1) containing a dimethoxymethylsilyl group (molecular weight of about 10,000) was obtained. As a result of $^1$H-NMR measurement (measured in a CDCl$_3$ solvent with JNM-LA400 produced by JEOL Ltd.), the average number of dimethoxymethyl silyl groups per molecule was found to be 1.6.

Synthesis Example 4

Propylene oxide was polymerized in the presence of polypropylene triol as an initiator, a zinc hexacyanocbaltate glyme complex catalyst, and tetrahydrofuran to provide a branched hydroxy-terminated polyoxypropylene polymer having a molecular weight of about 12,000. To the hydroxy-terminated polyoxypropylene polymer was added a solution of NaOCH$_3$ in methanol in an amount corresponding to 1.2 equivalents to hydroxy groups of the polymer, and the methanol was distilled off. Then, allyl chloride was added, and thereby each terminal hydroxy group was converted to an allyloxy group. To 2,000 g of the desalination-purified allyloxy-terminated polyoxypropylene polymer were added 2,6-di-tert-butyl-p-cresol as an antioxidant and hexane as an azeotropic solvent, and the mixture was azeotropically dehydrated at 90° C. Then, the hexane was removed under reduced pressure, and the atmosphere was replaced by nitrogen. The resulting product was mixed with 100 μl of a solution of a platinum-vinylsiloxane complex in isopropanol (platinum content: 3 wt %), and the mixture was reacted with 35.6 g of dimethoxymethylsilane for two hours at 90° C. with stirring. The mixture was then deaerated under reduced pressure, and thereby a branched polyoxypropylene polymer (B-2) containing a dimethoxymethylsilyl group (molecular weight of about 12,000) was obtained. As a result of $^1$H-NMR measurement (measured in a CDCl$_3$ solvent with JNM-LA400 produced by JEOL Ltd.), the average number of dimethoxymethylsilyl groups per molecule was found to be 2.2.

Synthesis Example 5

An amount of 100 g (20 mmol) of polyoxypropylene diol having a molecular weight of about 5,000 (hydroxy-equivalent amount: 0.36 mmol/g) and 5.6 g (22.5 mmol) of MDI (4,4'-diphenylmethane diisocyanate, product of Wako Pure Chemical Industries, Ltd) corresponding to an NCO/OH ratio of 1.25 were mixed under nitrogen atmosphere. The mixture was reacted for three hours at 90° C. to give an NCO-terminated polyoxypropylene. Thereafter, 1.6 g (9 mmol) of γ-aminopropyltrimethoxysilane (product of Momentive Performance Materials Inc.) was added. The mixture was reacted for one hour at 40° C. and deaerated under reduced pressure, and thereby a trimethoxysilyl group-terminated polyoxypropylene (B-3) was obtained. Further, the silyl group introduction rate was measured by $^1$H-NMR, and the number of terminal trimethoxysilyl groups was 1.7 per molecule on average.

Synthesis Example 6

Propylene oxide was polymerized in the presence of polyoxypropylene glycol having a molecular weight of about 3,000 as an initiator, a zinc hexacyanocobaltate glyme complex catalyst, and tetrahydrofuran to provide a hydroxy-terminated bifunctional polypropylene oxide (referred to as polymer Q) having a molecular weight of about 17,000.

An amount of 1.8 parts by weight of γ-isocyanatopropyltrimethoxysilane was added to 100 parts by weight of the polymer Q, and the mixture was reacted for five hours at 90° C. Thereafter, the mixture was deaerated under reduced pressure, and a trimethoxysilyl group-terminated polyoxypropylene polymer (B-4) was obtained. Further, the silyl group introduction rate was measured by $^1$H-NMR, and the number of terminal trimethoxysilyl groups was 1.4 per molecule on average.

Synthesis Example 7

Propylene oxide was polymerized in the presence of butanol as an initiator, a zinc hexacyanocobaltate glyme complex catalyst, and tetrahydrofuran to provide a hydroxy-terminated polyoxypropylene polymer having a molecular weight of about 5,400. To the hydroxy-terminated polyoxypropylene poly mer was added a solution of NaOCH$_3$ in methanol in an amount corresponding to 1.2 equivalents to hydroxy groups of the polymer, and the methanol was distilled off. Then, allyl chloride was added, and thereby each terminal hydroxy group was converted to an allyloxy group. To 2,000 g of the desalination-purified allyloxy-terminated polyoxypropylene polymer were added 2,6-di-tert-butyl-p-cresol as an antioxidant and hexane as an azeotropic solvent, and the mixture was azeotropically dehydrated at 90° C. Then, the hexane was removed under reduced pressure, and the atmosphere was replaced by nitrogen. The resulting product was mixed with 100 µl of a solution of a platinum-vinylsiloxane complex in isopropanol (platinum content: 3 wt %), and the mixture was reacted with 37.2 g of dimethoxymethylsilane for two hours at 90° C. with stirring. The mixture was then deaerated under reduced pressure, and thereby a polyoxypropylene polymer (C-1) containing a dimethoxymethylsilyl group (molecular weight of about 5,400) was obtained.

As a result of $^1$H-NMR measurement (measured in a CDCl$_3$ solvent with JNM-LA400 produced by JEOL Ltd.), the average number of dimethoxymethylsilyl groups per molecule was found to be 0.96.

Examples 1 to 6, Comparative Examples 1 and 2

The organic polymer (I), organic polymer (II), plasticizer, filler, thixotropic agent, various stabilizers, dehydrating agent, adhesion-imparting agent, curing catalyst, and the like were weighed according to the formulation shown in Table 1, and were mixed and kneaded by a mixer under dehydration conditions with substantially no water. Thereafter, the mixture was hermetically packed in a moisture-proof container (polyethylene cartridge). Thus, a one-pack type curable composition was prepared. When used, each of the one-pack type compositions in Table 1 was taken from each cartridge, and the following evaluations were performed.

TABLE 1

| Formulation (part(s) by weight) | | | Examples | | | | | | Comparative Examples | |
|---|---|---|---|---|---|---|---|---|---|---|
| | | | 1 | 2 | 3 | 4 | 5 | 6 | 1 | 2 |
| Organic polymer (II) | B-1 | | 100 | 100 | | | | | 100 | |
| | B-2 | | | | 100 | 100 | | | | 100 |
| | B-3 | | | | | | 100 | | | |
| | B-4 | | | | | | | 100 | | |
| Organic polymer (I) | A-1 | | 40 | | 40 | | 40 | 40 | | |
| | A-2 | | | 40 | | 40 | | | | |
| Plasticizer | UCON LB-65 | | 25 | 25 | 25 | 25 | 25 | 25 | 25 | |
| | UCON 50-HB-260 | | | | | | | | 40 | |
| | C-1 | | | | | | | | | 65 |
| Colloidal calcium carbonate | Ultra Pflex | | 30 | 30 | 30 | 30 | 30 | 30 | 30 | 30 |
| Surface-treated heavy calcium carbonate | Hubercarb G2T | | 100 | 100 | 100 | 100 | 100 | 100 | 100 | 100 |
| Titanium oxide | Ti-Pure R902+ | | 20 | 20 | 20 | 20 | 20 | 20 | 20 | 20 |
| Thixotropic agent | Crayvallac SL | | 2 | 2 | 2 | 2 | 2 | 2 | 2 | 2 |
| Ultraviolet absorber | Tinuvin 328 | | 1 | 1 | 1 | 1 | 1 | 1 | 1 | 1 |
| Light stabilizer | Tinuvin 770 | | 1 | 1 | 1 | 1 | 1 | 1 | 1 | 1 |
| Amino group-containing silane coupling agent | A-1120 | | 3 | 3 | 3 | 3 | 3 | 3 | 3 | 3 |
| Other silane coupling agent | A-171 | | 3 | 3 | 3 | 3 | 3 | 3 | 3 | 3 |
| Curing catalyst | Neostann U-220H | | 1.5 | 1.5 | 1.5 | 1.5 | | | 1.5 | 1.5 |
| | Fomrez SUL-4 | | | | | | 0.2 | 0.2 | | |
| Total | | | 326.5 | 326.5 | 326.5 | 326.5 | 325.2 | 325.2 | 326.5 | 326.5 |
| Moisture permeability of cured coating film | Coating film thickness: α | mil | 30.4 | 31.3 | 34.0 | 33.1 | 31.2 | 32.5 | 31.6 | 31.6 |
| | Moisture permeance (ASTM E-96): β | perm | 20.4 | 18.9 | 21.6 | 20.8 | 19.8 | 18.9 | 20.4 | 12.6 |
| | [α × β/1000] | perm-inch | 0.62 | 0.59 | 0.74 | 0.69 | 0.62 | 0.61 | 0.84 | 0.40 |
| Plasticizer migration to surface of cured coating film | 23° C., 50% RH | | A | A | A | A | A | A | A | A |
| | 15° C., 95% RH | | A | A | A | A | A | A | D | A |
| Plasticizer exudation by water immersion | Rate of weight decrease | % | −4.4 | −5.4 | −6.1 | −6.9 | −5.7 | 5.2 | −10.9 | −0.3 |

The various compounding components other than the organic polymer (I), organic polymer (II), and plasticizer C-1 used are listed below.

<Plasticizer>
Ucon LB-65 (product of Dow Chemical Company, polypropylene glycol)
Ucon 50-HB-260 (product of Dow Chemical Company, polypropylene glycol-polyethlene glycol block polymer)
<Colloidal Calcium Carbonate>
Ultra-Pflex (product of Specialty Minerals Inc.)
<Surface-Treated Heavy Calcium Carbonate>
Hubercarb G2T (product of Huber Engineered Materials)

<Titanium Oxide>
Ti-Pure R902+ (product of DuPont)
<Thixotropic Agent>
Crayvallac SL (product of CRAY VALLEY, amide wax thixotropic agent)
<Ultraviolet Absorber>
Tinuvin 328 (product of Ciba Specialty Chemicals)
<Light Stabilizer>
Tinuvin 770 (product of Ciba Specialty Chemicals)
<Amino Group-Containing Silane Coupling Agent>
A-1120 (product of Momentive Performance Materials Inc., N-(β-aminoethyl)-γ-aminopropyltrimethoxysilane)
<Other Silane Coupling Agent>
A-171 (product of Momentive Performance Materials Inc., vinyltrimethoxysilane)
<Curing Catalyst>
Neostann U-220H (product of Nitto Kasei Co., Ltd., dibutyltin bisacetylacetonate)
FomrezSUL-4 (product of Momentive Performance Materials Inc., dibutyltin dilaurate)

(Moisture Permeability of Cured Product)

The moisture permeability was evaluated according to the water method (wet cup method) of ASTM E96. Each of the compositions of Table 1 was applied to a Teflon film, and the thickness of the composition was adjusted to about 30 mil by a spacer and a flat spatula. Then, the composition was cured for four days in a constant temperature and constant humidity room (23° C./50% RH) and then for three days in a 50° C. oven. After the curing, the cured product sheet was cut into the cup size and the thickness (α) was measured. A special cup for moisture permeance measurement (product of Gardco) was charged with about 15 g of water, and the cured product sheet, a clamping ring, and a cap were set thereon in this order. After the weight measurement, the cup was weighed at an interval of about 24 hours for four days in a constant temperature and constant humidity room (23° C./50% RH), and the moisture permeance (β) was calculated. Further, the moisture permeability was calculated as [α×β/1000] (unit: perm-inch) using (α) and (β) values.

(Plasticizer Migration to Cured Product Surface)

Each of the compositions of Table 1 was applied to a Teflon film, and the thickness of the composition was adjusted to about 30 mil by a spacer and a flat spatula. Then, the composition was cured for four days in a constant temperature and constant humidity room (23° C./50% RH) and then for three days in a 50° C. oven. Thereby, a coating film (cured product) was obtained. The cured product was left in a constant temperature and constant humidity room (23° C./50% RH) or under 15° C./95% RH conditions, and the migration of plasticizer to the coating film surface was evaluated by observation and finger touching. The cured product was evaluated as A if no migration of plasticizer was observed, evaluated as B if slight migration of plasticizer was observed, evaluated as C if apparent migration of plasticizer was observed, and evaluated as D if significant migration of plasticizer was observed.

(Plasticizer Exudation by Water Immersion of Cured Product)

Each of the compositions of Table 1 was applied to a Teflon film, and the thickness of the composition was adjusted to about 3 cm by a spacer and a flat spatula. Then, the composition was cured for four days in a constant temperature and constant humidity room (23° C./50% RH) and then for three days in a 50° C. oven. Thereafter, the cured product was cut into a size of about 1 inch×1 inch. The weight of each sample was measured (W1), the sample was put into a glass bottle containing pure water, and the bottle was left in a constant temperature and constant humidity room for one week. The sample was taken out of water, and the water in the sample was evaporated for one week in a 70° C. oven. After leaving the sample in a constant temperature and constant humidity room for several hours, the weight of the sample was measured (W2) and the exudation rate (R) of plasticizer of each sample was calculated.

$$R=(W2-W1)/W1\times100(\%)$$

As shown in Table 1, the curable compositions of Examples 1 to 6 each containing the organic polymer (I) and the organic polymer (II) can maintain high moisture permeability and can effectively prevent plasticizer migration and plasticizer exudation into water.

The invention claimed is:

1. A curable composition comprising
5 to 200 parts by weight of an organic polymer (I) that has less than one hydrolyzable silyl group per molecule on average and contains 5 to 80 wt % of oxyethylene units, and
100 parts by weight of an organic polymer (II) having at least one hydrolyzable silyl group per molecule on average.

2. The curable composition according to claim 1, wherein the organic polymer (I) is a polyoxyalkylene polymer that contains 5 to 80 wt % of oxyethylene units.

3. The curable composition according to claim 1, wherein the organic polymer (I) is produced from a compound containing one active hydrogen as a starting material.

4. The curable composition according to claim 1, wherein the organic polymer (I) is produced by converting the active hydrogen of the starting material into a hydrolyzable silyl group.

5. The curable composition according to claim 1, wherein the number average molecular weight of the organic polymer (I) is 500 to 15,000.

6. The curable composition according to claim 1, wherein the organic polymer (I) is a copolymer of ethylene oxide and propylene oxide.

7. The curable composition according to claim 1, wherein the organic polymer (II) is a polyoxyalkylene polymer.

8. The curable composition according to claim 1, wherein the organic polymer (II) contains oxypropylene units in a main chain thereof.

9. The curable composition according to claim 1, wherein the number average molecular weight of the organic polymer (II) is 2,000 to 50,000.

10. The curable composition according to claim 1, wherein the organic polymer (II) is produced by ring-opening addition polymerization of an alkylene oxide in the presence of a double metal cyanide complex catalyst.

11. The curable composition according to claim 1, wherein the organic polymer (II) contains, in a main chain skeleton thereof, a group represented by formula (2):

$$-NR^5-C(=O)- \quad (2)$$

wherein $R^5$ is a hydrogen atom or a monovalent organic group.

12. The curable composition according to claim 1, which contains 100 parts by weight of the organic polymer (II), 5 to 200 parts by weight of the organic polymer (I), 1 to 250 parts by weight of a filler, 0.1 to 20 parts by weight of an amino group-containing silane coupling agent, and 0.01 to 10 parts by weight of a curing catalyst.

13. A waterproof coating material comprising the curable composition according to claim 1.

14. A curable composition comprising
an organic polymer (I) that has less than one hydrolysable silyl group per molecule on average and contains 5 to 80 wt % of oxyethylene units, and
is produced by converting the active hydrogen of the starting material into a hydrolysable silyl group.

15. The curable composition according to claim 14,
wherein the organic polymer (I) is a polyoxyalkylene polymer that contains 5 to 80 wt % of oxyethylene units.

16. The curable composition according to claim 14,
wherein the organic polymer (I) is produced from a compound containing one active hydrogen as a starting material.

17. The curable composition according to claim 14,
wherein the number average molecular weight of the organic polymer (I) is 500 to 15,000.

18. The curable composition according to claim 14, wherein the organic polymer (I) is a copolymer of ethylene oxide and propylene oxide.

19. A waterproof coating material comprising the curable composition according to claim 14.

\* \* \* \* \*